US012619109B2

(12) United States Patent
Jacques et al.

(10) Patent No.: US 12,619,109 B2
(45) Date of Patent: May 5, 2026

(54) DIFFERENTIAL DRIVE MODULATOR STRUCTURES FOR A LINEAR ELECTRO-OPTIC PLATFORM

(71) Applicant: CIENA CORPORATION, Hanover, MD (US)

(72) Inventors: Maxime Jacques, Montreal (CA); Gregory Brookes, Quebec (CA); Michael Vitic, Chelsea (CA); Alexandre Simard, Québec (CA); Douglas McGhan, Ottawa (CA); Ying Gao, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 395 days.

(21) Appl. No.: 18/296,676

(22) Filed: Apr. 6, 2023

(65) Prior Publication Data

US 2024/0248331 A1     Jul. 25, 2024

Related U.S. Application Data

(60) Provisional application No. 63/481,502, filed on Jan. 25, 2023.

(51) Int. Cl.
*G02F 1/03* (2006.01)
*G02F 1/035* (2006.01)

(52) U.S. Cl.
CPC .......... *G02F 1/0311* (2013.01); *G02F 1/0316* (2013.01); *G02F 1/0327* (2013.01); *G02F 1/035* (2013.01)

(58) Field of Classification Search
CPC .... G02F 1/0311; G02F 1/0316; G02F 1/0327; G02F 1/035
See application file for complete search history.

(56) References Cited

U.S. PATENT DOCUMENTS

2005/0201686 A1* 9/2005 Cole ..................... G02F 1/0316
                                                                         385/40
2014/0112611 A1   4/2014 Vermeulen et al.
(Continued)

FOREIGN PATENT DOCUMENTS

WO      2024158785      8/2024

OTHER PUBLICATIONS

Baeuerle, et al., "120 GBd plasmonic Mach-Zehnder modulator with a novel differential electrode design operated at a peak-to-peak drive voltage of 178 mV", DOI: 10.1364/OE.27.016823 | https://doi.org/10.1364/OE.27.016823, 2019, 10 Pages.
(Continued)

*Primary Examiner* — Joseph P Martinez
(74) *Attorney, Agent, or Firm* — Guntin & Gust, PLC; Mark Wilinski

(57) ABSTRACT

Disclosed are differential-drive electro-optic modulator structures for linear electro-optic (Pockels) platforms such as thin-film LiNbO3 (TFLN), directly compatible with traditional differential-output analog drivers, such as a linear electro-optic modulator, including: a first signal trace; a second signal trace, wherein the first signal trace and the second signal trace are driven by a differential signal; a first optical arm; and a second optical arm, wherein a geometry of the first signal trace and the second signal trace causes the differential signal to modulate optical signals in the first optical arm and the second optical arm, such that when the optical signals are combined to create a resultant optical signal, the geometry mitigates chirp in the resultant optical signal. Other embodiments are disclosed.

20 Claims, 14 Drawing Sheets

(56) References Cited

U.S. PATENT DOCUMENTS

2018/0239176 A1*  8/2018  Tsuzuki .................. G02F 1/025
2021/0080796 A1*  3/2021  Kissa .................... G02F 1/0356
2022/0390777 A1   12/2022  Kharel et al.

OTHER PUBLICATIONS

International Search Report & Written Opinion for PCT/US2024/012570 mailed Aug. 2, 2024, 11 pp.

"European Office Action received for EP Application Serial No. 24708599.6, Oct. 7, 2025, 9 Pages".

"International Preliminary Report on Patentability received for PCT Application Serial No. PCT/US2024/012570, Aug. 7, 2025, 8 Pages".

"European Office Action received for EP Application Serial No. 24708599.6, Mar. 19, 2026, 11 Pages".

\* cited by examiner

3. Dual–CPS electrode (GSSG)
Dual–drive differential, typical (same phase shift in both arms)

4. SGS
Dual–drive differential, unshielded (same phase shift in both arms)

600

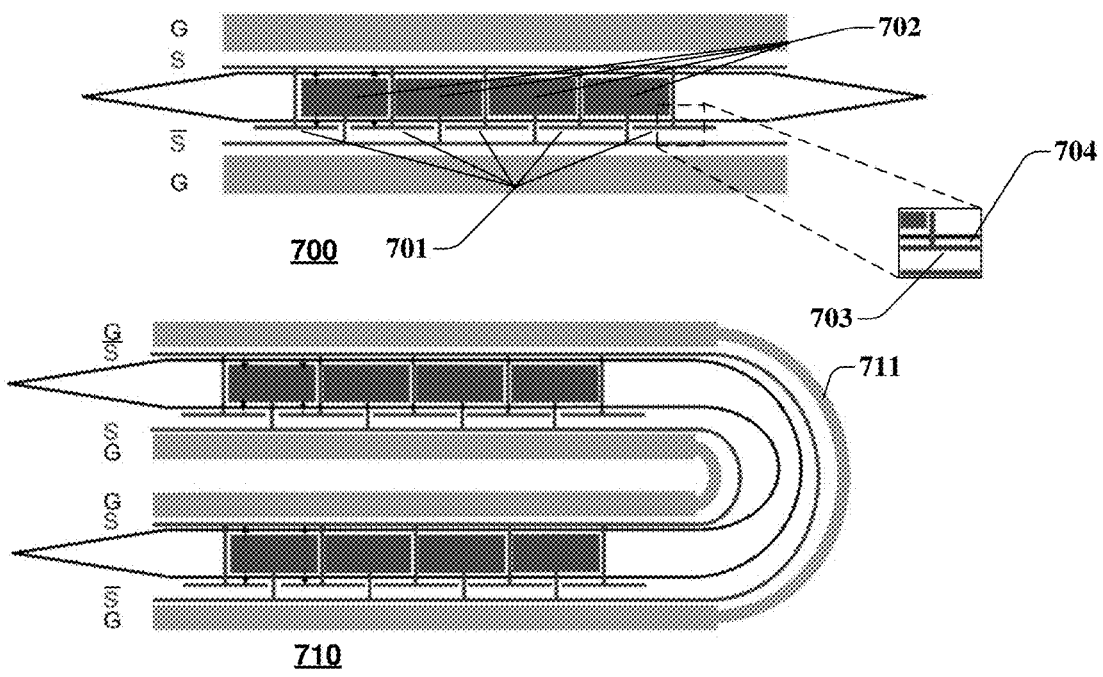
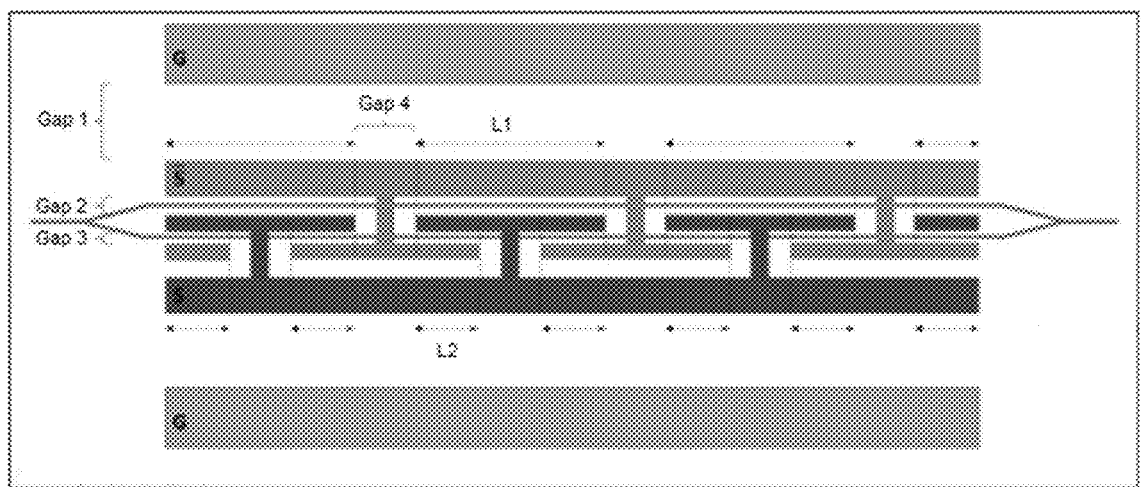
FIG. 7
FIG. 8

Regular waveguide 'serpentines' (optical delays)

DIFFERENTIAL DRIVE MODULATOR STRUCTURES FOR A LINEAR ELECTRO-OPTIC PLATFORM

CROSS REFERENCE TO RELATED APPLICATIONS

The subject disclosure claims the benefit of U.S. Provisional Patent Application No. 63/481,502 filed Jan. 25, 2023, which is incorporated by reference herein.

FIELD OF THE DISCLOSURE

The subject disclosure relates to differential drive modulator structures for a linear electro-optic (Pockels) platforms, such as thin-film lithium niobate (TFLN).

BACKGROUND

Differential-output drivers are generally preferred over single-end output, among others because they allow to 1) cancel or strongly suppress common-mode noise and other common impairments (even-order harmonics) present at the DAC/driver channel output, 2) increase the available swing at the modulator (by using both complements of a differential driver as opposed to one), and 3) for a fixed total driver swing and fixed modulator termination resistance, up to halve the dynamic power consumption at the travelling-wave (TW) Mach-Zehnder modulator (MZM) termination. This is because for a prescribed optical phase shift at the TW-MZM, differential-driving allows to halve the swing of each signal (within the pair) compared to single-ended driving. This allows for a theoretical 2× reduction in dynamic driver power consumption as set forth in the following equation:

$$2x\frac{(V_{rms}/2)^2}{R_{term}} = \frac{1}{2}\frac{V_{rms}^2}{R_{term}}$$

Furthermore, differential-output drivers can also reduce static power consumption by reducing the supply voltage since the signal swing is shared between two complements of a differential pair. The driving signals reduce the supply voltage by ½ the swing, while still maintaining the same headroom as single-ended drive. Finally, differential driving also allows for unterminated topologies such as Emitter Follower, Push Pull and Open-Collector (OC) topologies, whereas single-ended driven MZMs would be essentially restricted to Traveling-Wave Amplifiers (TWA) or a terminated single-ended driver.

In the context of TW-MZMs, drivers with differential channel outputs are usually employed to drive coplanar strip (CPS) or dual coplanar waveguide (CPW) RF electrode layouts of the type:

$\overline{S}$-S(CPS, 'series push-pull' MZM architecture for SiPhot),

G-$\overline{S}$-S-G (dual-CPS),

G-$\overline{S}$-G-S-G (dual-CPW, fully shielded), or slightly different variations thereof.

These TW electrode layouts are fairly common in integrated modulator technologies such as InP and SiPhot, which respectively rely on the quantum-confined Stark effect (QCSE) and plasma dispersion (free-carrier refraction).

However, for linear-phase electro-optic (E-O) crystals such as bulk LiNbO3 (LN), or the more recent integrated platform thin-film LiNbO3 (TFLN), the fixed crystal orientation (or a direction of the highest Pockels coefficient) across a chip, the low linear capacitance (absence of pn junction loading in the optical waveguides) and the field-effect nature of the modulators seem to point toward optimal RF electrode configurations of the type G-S-G (ground-signal-ground, i.e., single-ended), and $\overline{S}$-S-$\overline{S}$ or G-$\overline{S}$-S-$\overline{S}$-G (differential). The G-S-G configuration is by far the most prevalent for E-O (Pockels) modulators. Generally, this modulator category also includes EO Polymer-based devices.

BRIEF DESCRIPTION OF THE DRAWINGS

Reference will now be made to the accompanying drawings, which are not necessarily drawn to scale, and wherein:

FIG. 7 is a block diagram illustrating an example, non-limiting embodiment of a G$\overline{S}$SG MZM configuration for Pockels-based modulators with or without a fold and having inter-digitated T-rail capacitive segments in accordance with various aspects described herein.

FIG. 8 is a block diagram illustrating an example, non-limiting embodiment of a G$\overline{S}$SG MZM configuration for Pockels-based modulators having inter-digitated T-rail capacitive segments and a symmetrical RF design for SS in accordance with various aspects described herein.

DETAILED DESCRIPTION

Figure 1A:
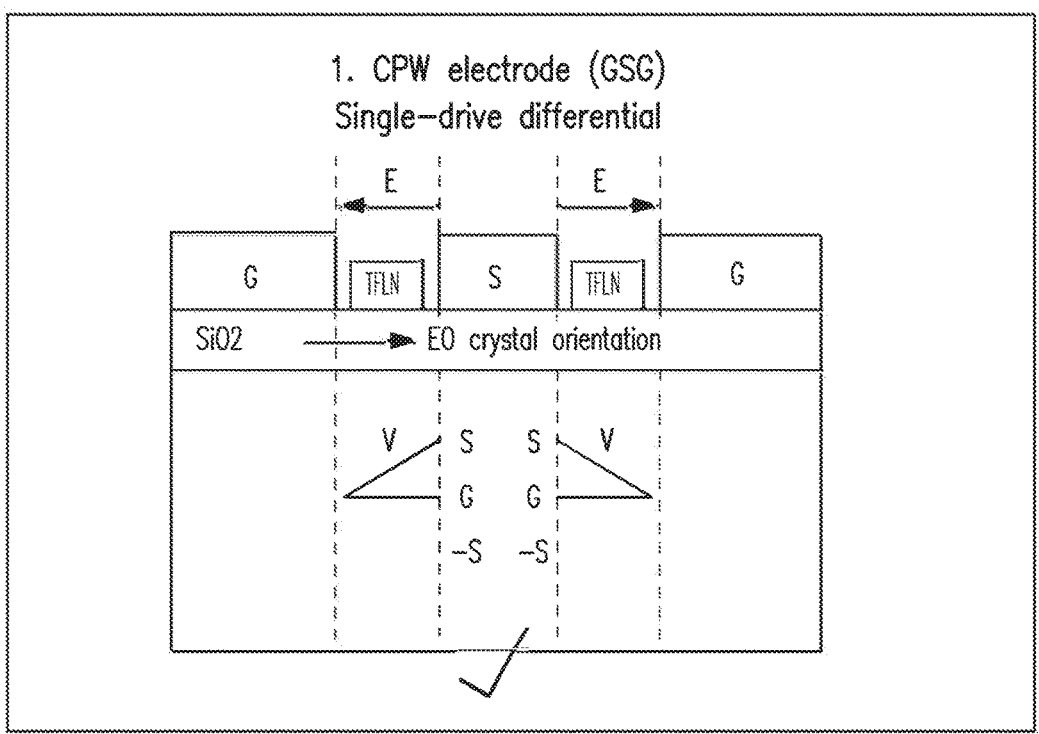
FIGS. 1A-1F are block diagrams illustrating various prior art modulator RF electrode configurations.
Figure 1B:
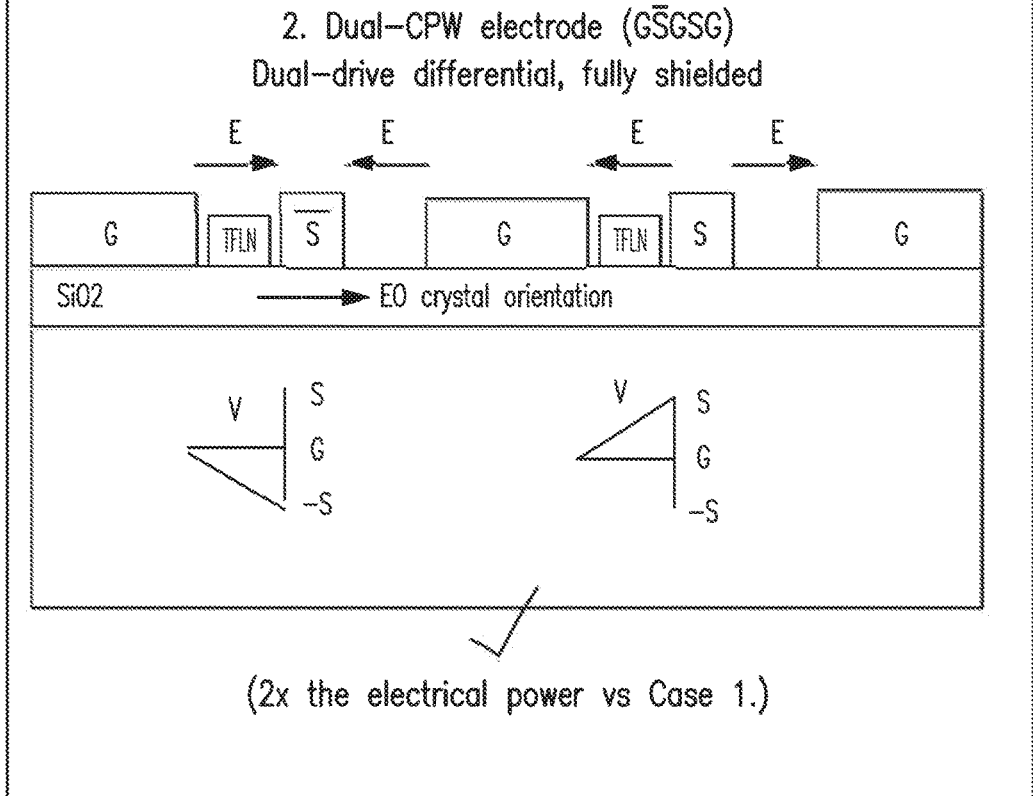
Figure 1C:
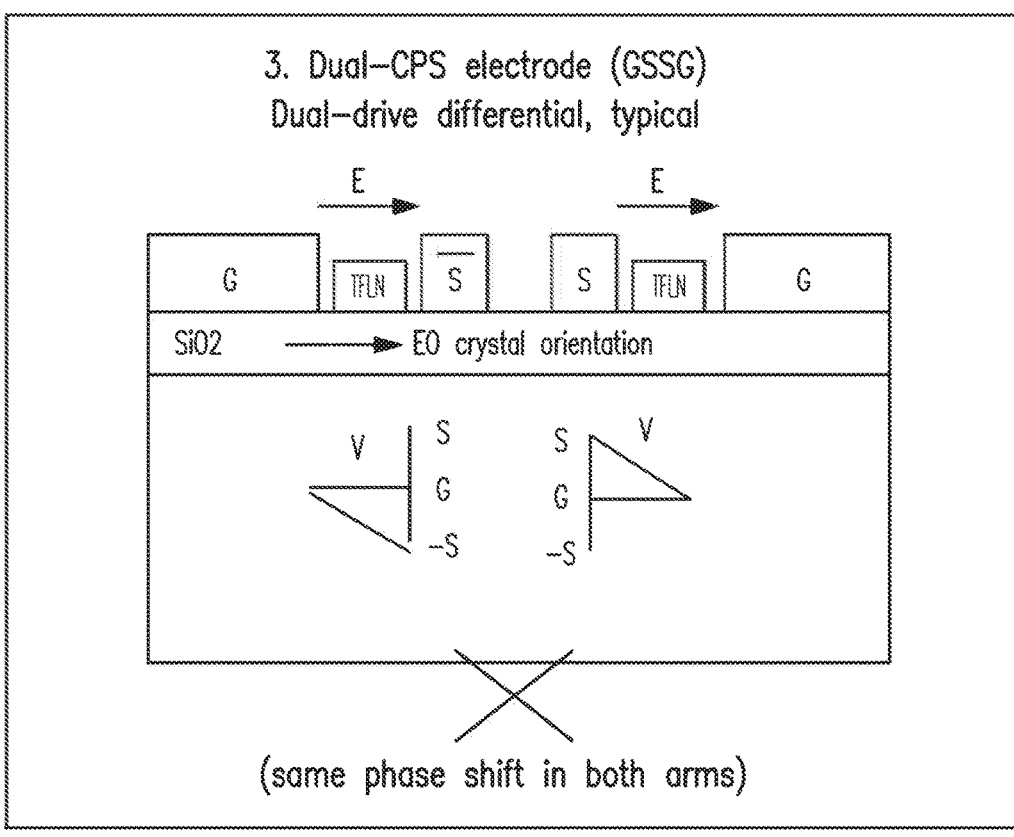
Figure 1D:
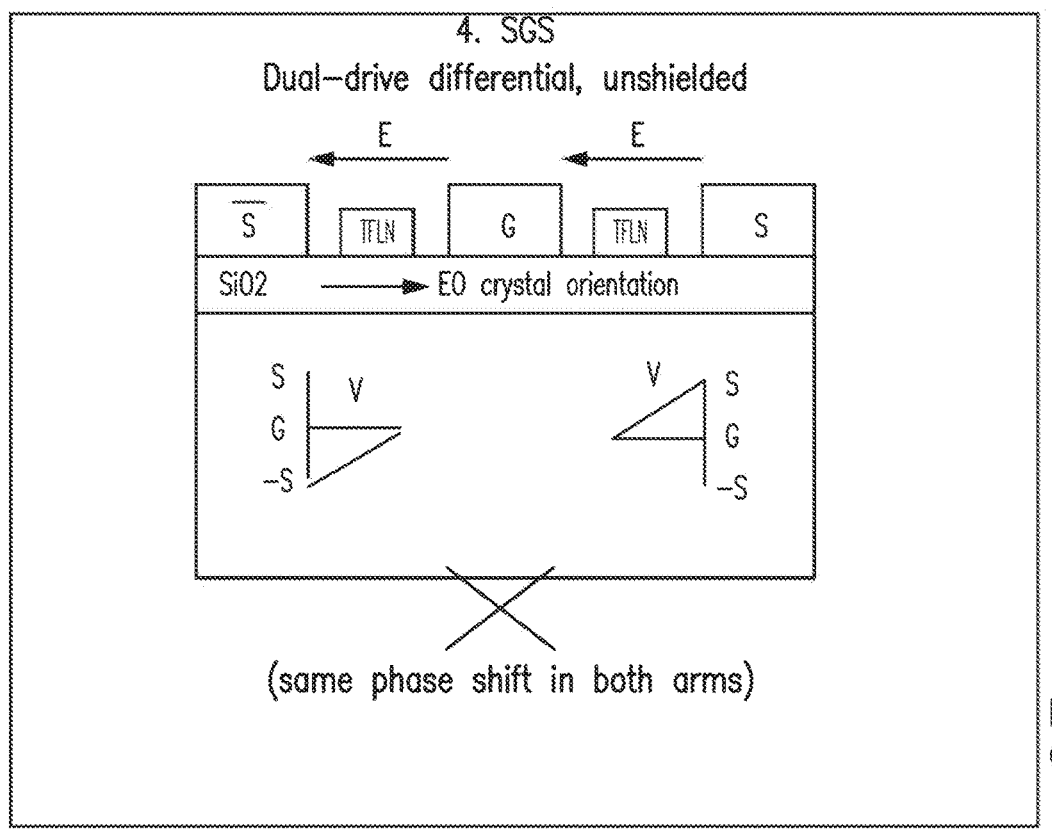
Figure 1E:
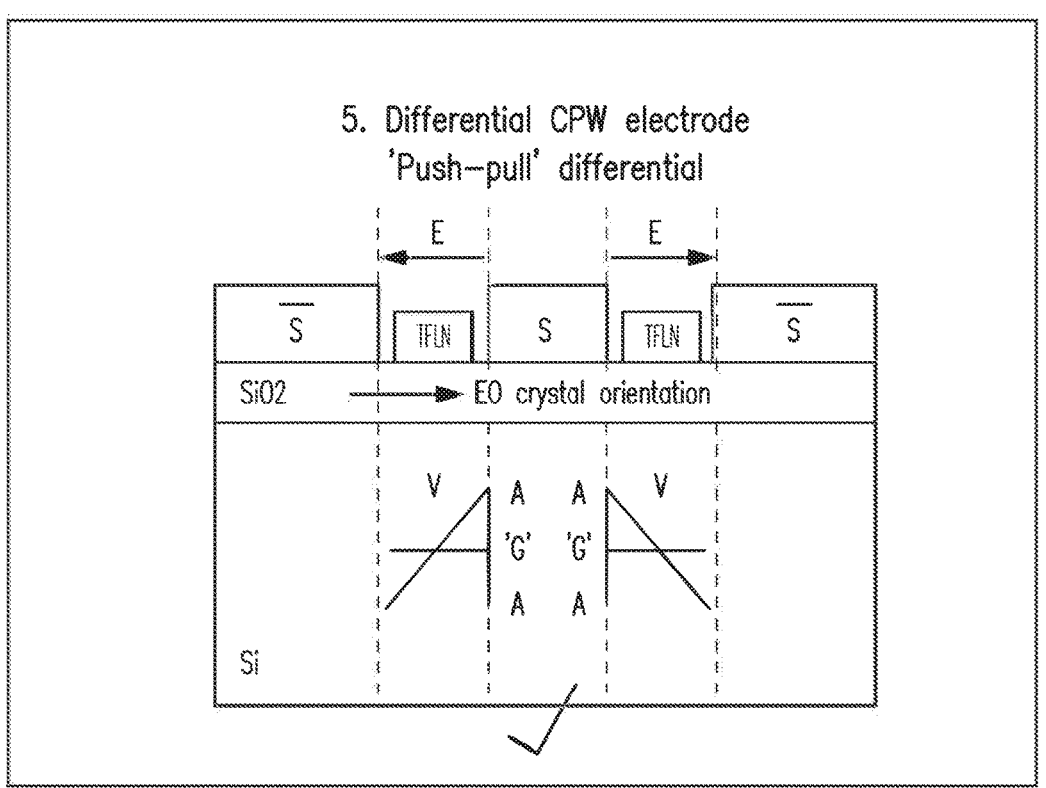
Figure 1F:
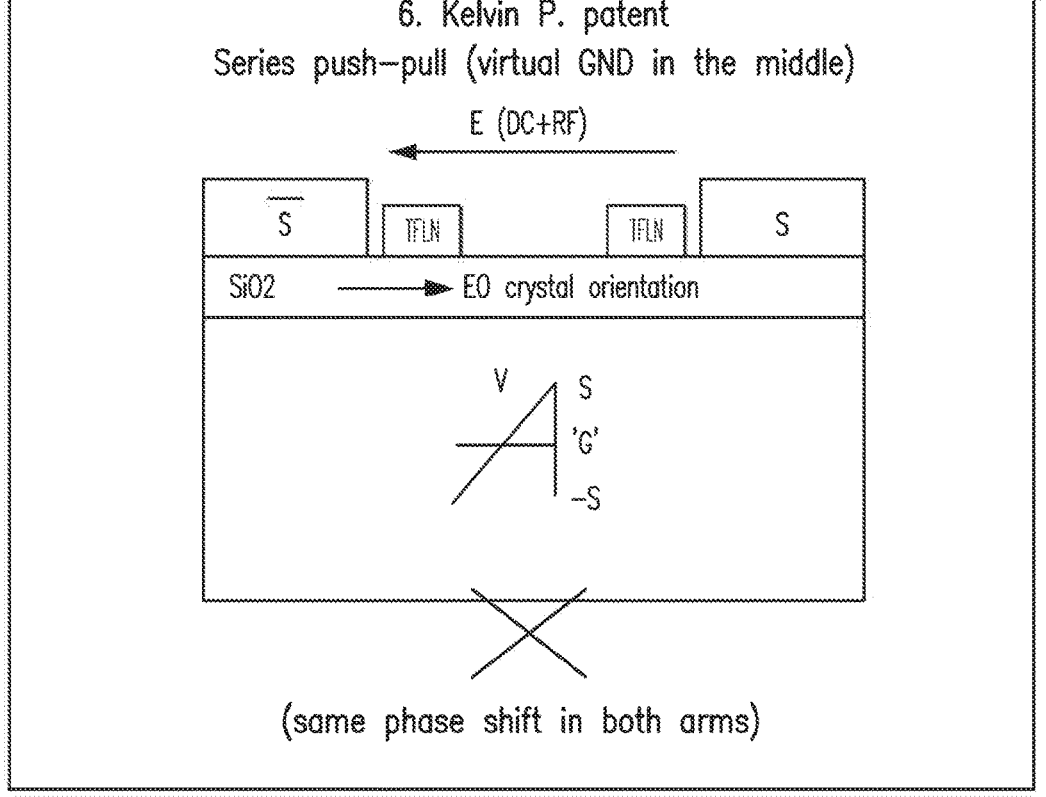

The subject disclosure describes, among other things, illustrative embodiments for electro-optic, thin-film lithium niobate differential drive Mach-Zehnder modulators. Other embodiments are described in the subject disclosure.

One or more aspects of the subject disclosure include a linear electro-optic modulator, including: a first signal trace; a second signal trace, wherein the first signal trace and the second signal trace are driven by a differential signal; a first optical arm; and a second optical arm, wherein a geometry of the first signal trace and the second signal trace causes the differential signal to modulate optical signals in the first optical arm and the second optical arm, such that when the optical signals are combined to create a resultant optical signal, the geometry mitigates chirp in the resultant optical signal.

One or more aspects of the subject disclosure include a method of modulating an optical signal, including: splitting the optical signal into a first optical signal and a second optical signal; providing the first optical signal to a first optical arm of a linear electro-optic modulator; providing the second optical signal to a second optical arm of the linear electro-optic modulator; applying a differential electrical signal to a first signal trace and a second signal trace of the linear electro-optic modulator to modulate the first optical signal and the second optical signal, resulting in a modulated first optical signal and a modulated second optical signal; and combining the modulated first optical signal and the modulated second optical signal, wherein a geometry of the first signal trace and the second signal trace of the linear electro-optic modulator causes the differential electrical signal to modulate first optical signal in the first optical arm and the second optical signal in the second optical arm, such that when the optical signals are combined to create a resultant optical signal, the geometry mitigates chirp in the resultant optical signal.

One or more aspects of the subject disclosure include a method for manufacturing a linear electro-optic modulator, including: forming a first optical arm; forming a second optical arm; and forming a first signal trace and a second signal trace, wherein a geometry of the first signal trace and the second signal trace causes a differential signal applied to the first signal trace and the second signal trace to modulate a first optical signal in the first optical arm and a second optical signal in the second optical arm, such that a combination of the first and second optical signals creates a resultant optical signal, and wherein the geometry mitigates chirp in the resultant optical signal.

FIGS. 1A-1F are block diagrams illustrating various prior art modulator RF electrode configurations. Six possible numbered schemes are shown in FIGS. 1A-1F, scheme 1 is single drive, whereas schemes 2 to 6 are all differential drive:

Scheme 1 (single-drive CPW) is the simplest to implement at the modulator level and is hence employed in the vast majority of TFLN modulator demonstrations.

Scheme 5 (dual-drive CPW, or S-S-S) is the most straight-forward or 'natural' way to convert a conventional single-drive CPW TFLN modulator to dual-drive and avoid chirp. However, Scheme 5 is not openly available today and has not been demonstrated publicly in TFLN.

Schemes 2, 3, 4 & 6 are not directly applicable to TFLN because they cannot be implemented due to modulation or power considerations.

Figure 2:
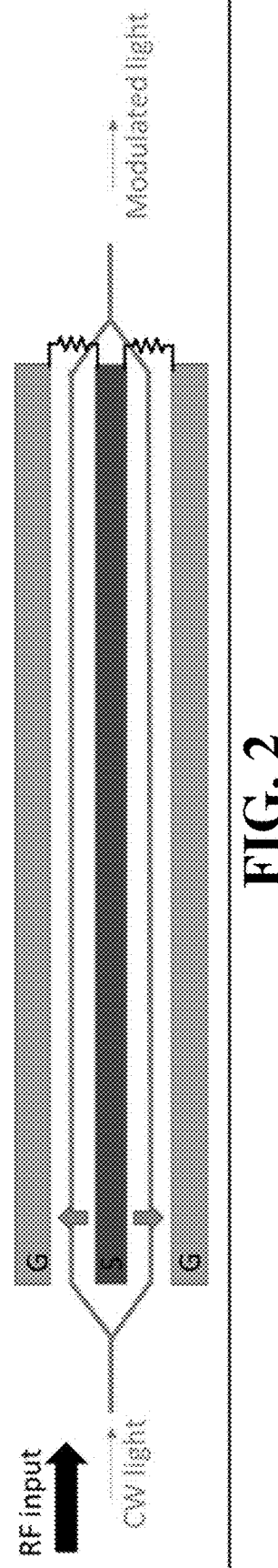
FIG. 2 is a block diagram illustrating a conventional single-ended TFLN modulator structure having an equivalent cross section illustrated in FIG. 1A, scheme 1.

FIG. 2 is a block diagram illustrating a conventional single-ended TFLN modulator structure having an equivalent cross section illustrated in FIG. 1A, scheme 1. There is currently a high interest in driving MZMs based on EO crystals efficiently, because of particularly superior performance recently measured on TFLN samples. For example, TFLN on silicon dioxide (SiO$_2$) MZMs have shown ~2 dB insertion loss, 1.4V DC Vpi S-E (from a differential driver perspective: equivalent to a 2.8V Vpi diff. modulator) and 100 GHz @ −4 dB E-O bandwidth in the C-band.

What is needed is a dual-drive MZM RF architecture that is conventional for incumbent technologies (e.g., SiPhot, InP), which may be adapted for compatibility with Pockels-based modulators such as TFLN, while avoiding creating a phase-shifting efficiency imbalance between the two arms (i.e., chirp). The modulation chirp parameter represents the ratio of phase modulation (PM) to amplitude modulation (AM) and may be expressed as $$a_m(t) = \frac{df/dt}{\frac{1}{E}dE/dt},$$

where f and E are the instantaneous phase and amplitude of the output optical field and t denotes the time. The modulation chirp parameter must generally be minimized (close to 0) for modern digital coherent communication systems. In a differential-action (push-pull) Mach-Zehnder modulator, residual phase modulation of the optical output might arise for example with imperfectly balanced differential drive signal pairs, or with a difference in loss or phase-shifting efficiency between the two arms of the modulator. The G$\overline{S}$SG modulator schemes described herein mitigate the latter chirp component by design for linear EO (Pockels) based modulator platforms. Mitigation in the exemplary embodiments can include reducing as well as eliminating any chirp.

This disclosure is directed toward adapting a standard G$\overline{S}$SG modulator electrode configuration (Scheme 3) to make it compatible with TFLN. The main enabling propositions for various G$\overline{S}$SG embodiments employ either: 1) an RF crossing, 2) MZM 180° folds, or 3) 'T-rail' capacitive segments along the TW-MZM, which all need to be carefully designed to avoid chirp, RF loss, velocity and phase matching issues.

Figure 3:
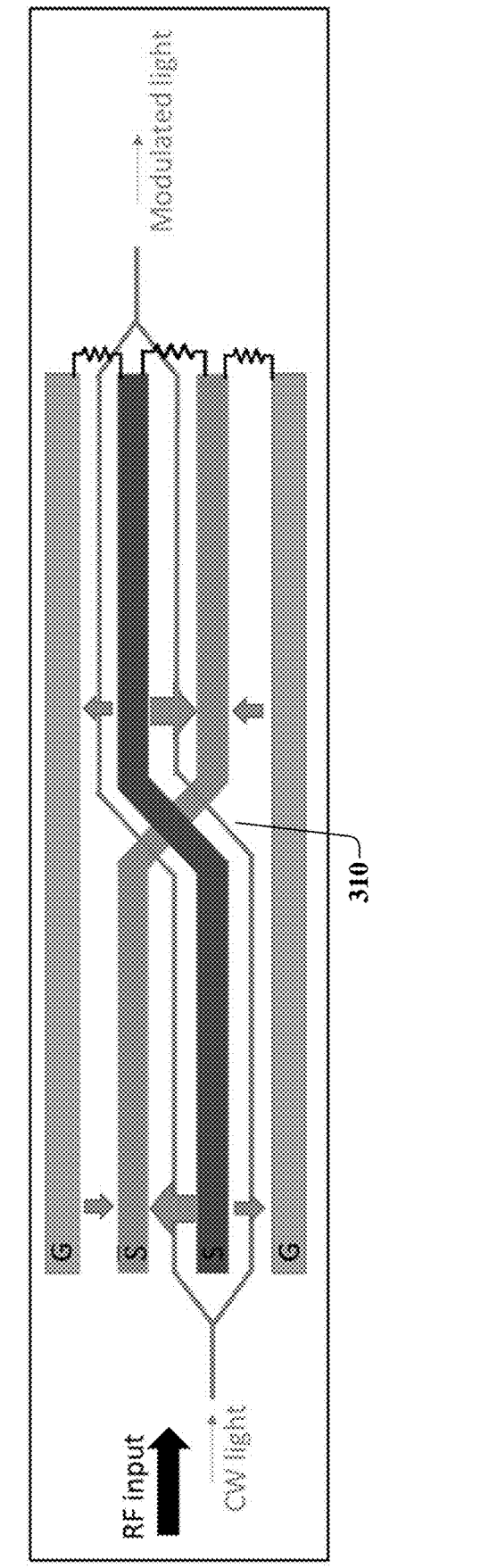
FIG. 3 is a block diagram illustrating an example, non-limiting embodiment of TFLN modulator in accordance with various aspects described herein.

FIG. 3 is a block diagram illustrating an example, non-limiting embodiment of an electro-optic modulator in accordance with various aspects described herein. As shown in FIG. 3, a TFLN MZM is shown designed for linear Pockels EO modulator that can be directly driven by conventional differential-output driver architectures of the type G$\overline{S}$SG or G$\overline{S}$GSG, which are the differential schemes employed. Carrier wave light enters the modulator at an optical input, passes through an optical splitter coupled to the optical input to produce two light beams. Each light beam travels through a thin-film lithium niobate arm comprising a first optical waveguide or a second optical waveguide, respectively, where they are modulated by the Pockels effect. Then each modulated light beam is combined in an optical combiner coupled to the first optical waveguide and the second optical waveguide, and the combined light beam passes out through an optical output coupled to the optical combiner as modulated light.

The modulator scheme involves a RF crossing 310 on the modulator substrate. The modulator chip thus requires at least usable metal layers (+vias), wire bonds, interposers, or the like, for the RF design. The RF crossing 310 between the electrodes is as close to normal (i.e., 90°) as possible to avoid microwave crosstalk as much as possible. The relative RF field amplitude and direction in the two sections of the modulator (before and after the RF crossing 310) is depicted with green arrows.

In the lossless approximation (no RF attenuation along the structure), and with the assumption above about gap widths, this MZM design allows for a 50% increase of the RF field amplitude over the full length of the modulator for both optical arms compared to the traditional GSG single-drive design, assuming the drive level achievable on the S and $\bar{S}$ RF electrodes separately is the same as the drive level achievable on the S electrode of the traditional GSG single-drive design (i.e., assuming that the two complements of a differential pair of drive signals can each reach the same peak-to-peak voltage amplitude as the equivalent single-ended design in the same technology and bandwidth, which is generally a reasonable assumption).

As shown in FIG. 3, Arm 2 of the MZM indeed sees the same RF field amplitude in the 1$^{st}$ half 410 of the modulator compared to the traditional GSG design but sees a 100% increase in the 2$^{nd}$ half 420, due to the 'push-pull' effect of the combined S and S electrodes. The opposite is true for Arm 1, resulting in an overall 50% theoretical phase-shifting efficiency increase for the whole structure compared to the traditional GSG design. In an alternative analysis considering either the 1$^{st}$ half 410 or 2$^{nd}$ half 420 of the structure, the total RF field seen by the optical waveguides is increased by 50% compared to FIG. 2.

An important design consideration here is the group delay matching between the optical wave and the RF wave in the section of the RF crossing 310 (and elsewhere). The phase mismatch must remain minimal to ensure low inter-symbol interference (ISI) and a high EO bandwidth or can even opportunistically be engineered to compensate known velocity mismatch in the straight segments. Furthermore, the MZM of FIG. 3 must have an RF termination design substantially matching the characteristic impedance of the desired electro-optically active microwave (MW) mode of the travelling-wave modulator structure.

Figure 4:
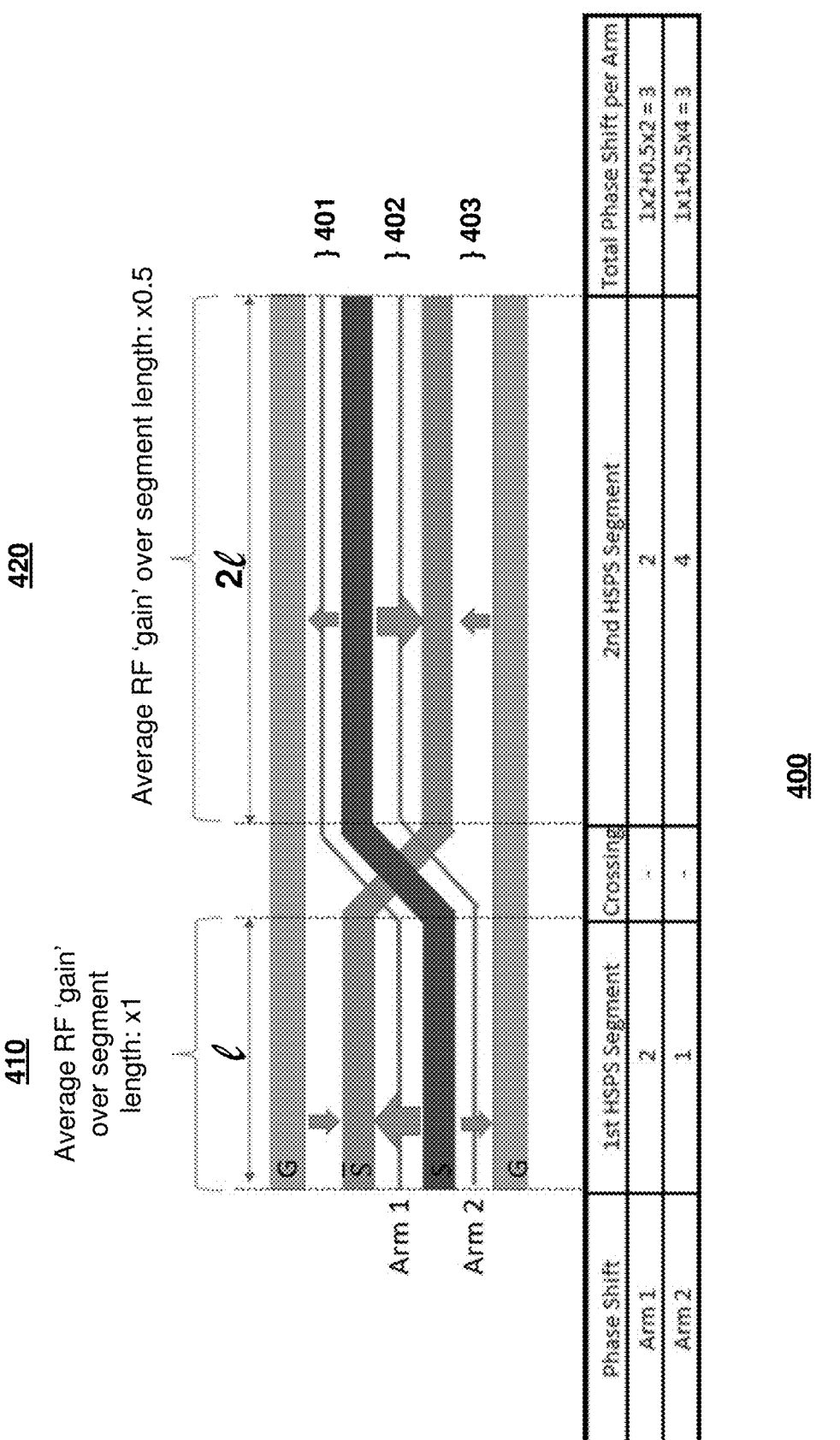
FIG. 4 is a block diagram illustrating an example, non-limiting embodiment of enhancing the field and optimizing the RF crossing location of TFLN modulator of FIG. 3 in accordance with various aspects described herein.

FIG. 4 is a block diagram illustrating an example, non-limiting embodiment of enhancing the net field and optimizing the RF crossing location of TFLN modulator of FIG. 3 in accordance with various aspects described herein. As shown in FIG. 4, the GSSG modulator 400 cross-section has equal-width gaps 401, 402, 403 between the G and S traces and between the $\bar{S}$S traces, such that at DC the amplitude of the applied electric field (as depicted by green arrows) is twice as high between S and S⁻ compared to between G and S (or $\bar{S}$). In other words, the GSSG structure is strongly coupled to GND (equally for S and $\bar{S}$). In this case, the impedance would drop compared to the weakly-coupled case.

To match the MW and optical group indices and to set the MW impedance to a prescribed value that is usually that of the driver (in both cases, considering the useful MW mode), the gap widths may be different within the G$\bar{S}$SG structure. Nonetheless, the general ideas discussed remain valid.

Still in the lossless approximation, note importantly that both optical arms undergo the same total phase after propagation through the whole structure, so this design is nominally chirpless. Since there will be some frequency dependent RF loss along the TW structure, the design of FIG. 3 (with equal length straight segments before and after the crossing) will inherently be chirped, i.e., lead to residual phase modulation due to unequal phase shift amplitude in both arms. To circumvent this, the ratio of the segment length before and after the RF crossing must be <1 (i.e., shorter segments before the crossing). The optimal length ratio depends on the average RF attenuation level (over frequency and) over each segment length (before and after the crossing). The length ratio should be the inverse of the ratio of the average RF attenuation before and after the crossing, so that the total phase shift is the same for both arms after propagation through the whole structure.

A simple example is shown in FIG. 4, in which the average RF attenuation after the crossing is twice as high as before the crossing and the length after the crossing is twice the length before the crossing.

Figure 5:
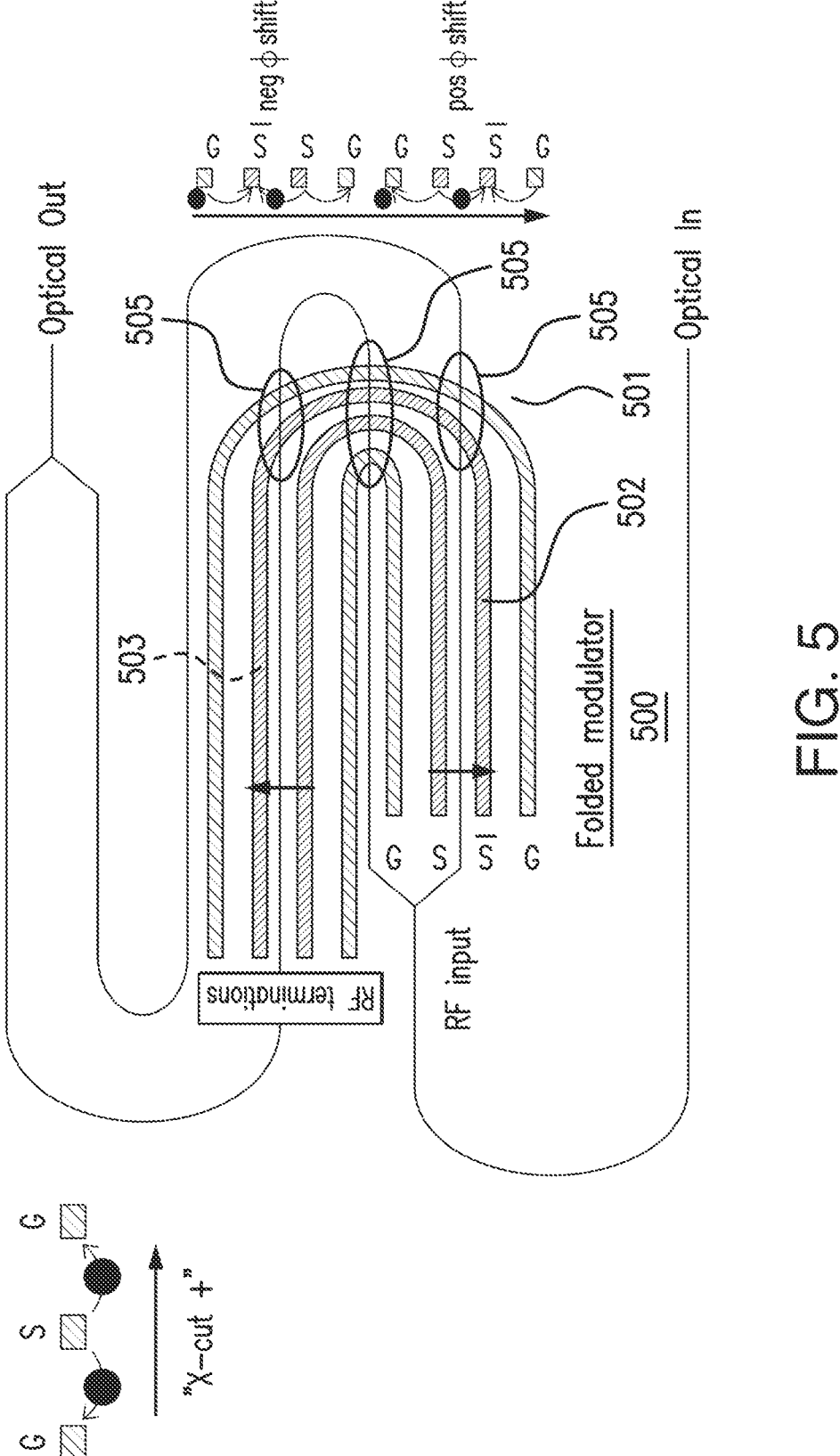
FIG. 5 is a block diagram illustrating an example, non-limiting embodiment of a G$\overline{S}$SG MZM configuration for Pockels-based modulators with a fold and a swap of the interferometer arm that is modulated before/after the fold in accordance with various aspects described herein.

FIG. 5 is a block diagram illustrating an example, non-limiting embodiment of a G$\bar{S}$SG MZM configuration for Pockels-based modulators with a fold and a swap of the interferometer arm that is modulated before/after the fold in accordance with various aspects described herein. As shown in FIG. 5, no optical or RF crossing is required in modulator 500. The active arm of modulator 500 changes after the U-bend (fold 501) since the orientation of the Pockels crystals is fixed across the chip. To avoid chirp, the segment 502 before the fold 501 needs to be shorter than the segment 503 after the fold 501 (accounting again for RF attenuation along the TWE). Segment 503 could also include a second bend. The precise length ratio between the segments before/after the fold 501 needs to be optimized (instead of before/after the RF crossing). A second metal layer (above the RF layer) is preferred in the optical waveguide/RF electrode crossovers 505, or a single RF metal layer that can be tailored (lowest part thinned down) to avoid optical absorption in the crossovers 505.

Figure 6:
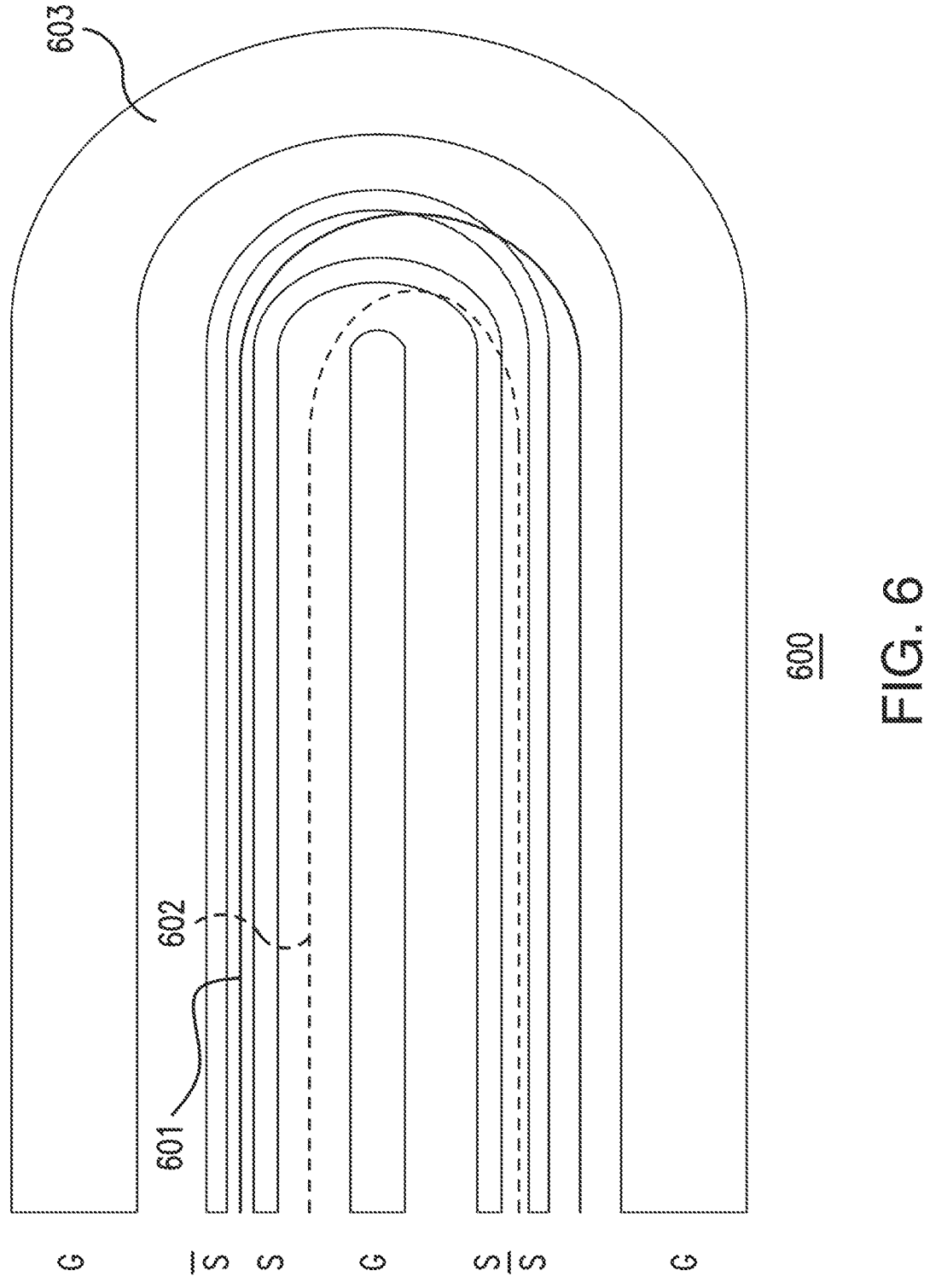
FIG. 6 is a block diagram illustrating an example, non-limiting embodiment of a G$\overline{S}$SG MZM configuration for Pockels-based modulators with a fold and both interferometer arms being modulated before/after the fold in accordance with various aspects described herein.

FIG. 6 is a block diagram illustrating an example, non-limiting embodiment of a G$\bar{S}$SG MZM configuration for Pockels-based modulators with a fold and both interferometer arms being modulated before/after the fold in accordance with various aspects described herein. As shown in FIG. 6, both optical waveguides 601, 602 in the modulator 600 are being modulated in the straight sections, which is more efficient than the configuration illustrated in FIG. 5. The segment before the bend 603 needs to be shorter than the segment after the bend (not shown) and the same length ratio optimization before/after the bend 603 should be performed. Segment 603 could also include a second bend.

FIG. 7 is a block diagram illustrating an example, non-limiting embodiment of a G$\bar{S}$SG MZM configuration for Pockels-based modulators with or without a fold and having inter-digitated T-rail segments in accordance with various aspects described herein. As illustrated in FIG. 7, the modulator 700 leverages careful optical waveguide positioning between inter-digitated T-rails to produce a balanced optical phase shift in both optical waveguides. Specifically, a first waveguide (black) is located between a top signal electrode (S trace, in blue) and the top part of bottom T-rail segments 702 of a bottom signal trace (S̄ trace, in red). The second waveguide is located between the bottom part of a bottom T-rail segments 701 (in red) and a bottom side of the top T-rail segments 701 (in blue, hanging downward). T-rail capacitive segments 701 for the S trace are inter-digitated with thicker T-rail capacitive segments 702 provided for the S̄ trace. Both T-rail capacitive segments 701, 702 have a top side 703 of the T and a bottom side 704 of the T, as shown in the magnified illustration. The T-rail designs illustrated in FIGS. 8-10 below are shown without a fold, but a fold 711 may be incorporated, as shown in the modulator 710 of FIG. 7. The modulator 710 may also reverse the thickness geometry of the T-rail capacitive segments after a fold 711. The fold 711 is not necessary for chirpless operation, but merely allows for a more compact device design.

Generally, incorporating T-rail capacitive segments to a TWE structure reduces current density along the electrode edges, therefore reducing ohmic losses and extending the device usable bandwidth (since ohmic losses are generally the dominant EO bandwidth-limiting mechanism in TFLN modulators). Moreover, T-rails add additional degrees of freedom for design, for example allowing to optimize both the TW-MZM characteristic impedance (Zc) and the MW velocity (to match the optical group index) independently.

GS̄SG TFLN modulator designs relying on T-rails instead of RF crossings or bends will enable a more broadband chirpless operation, since the accumulated phase shift in both arms is nominally the same at every point along the TW-MZM and at every frequency, rendering the design independent from RF attenuation, assuming the RF electric field is symmetric in both optical waveguides and the T-rails do not allow for additional RF modes at higher frequencies.

FIG. 8 is a block diagram illustrating an example, non-limiting embodiment of a GS̄SG MZM configuration for Pockels-based modulators having inter-digitated T-rail capacitive segments and a symmetrical RF design for SS in accordance with various aspects described herein. As illustrated in FIG. 8, the design uses two signal electrodes, and a way to compensate the lesser modulation fill factor of the bottom optical waveguide by making Gap 3<Gap 2. The main challenge is to match MW velocity with optical velocity (ng_opt~2.22). A thicker SiO2 box thickness or even a new type of substrate, such as quartz could compensate for the higher MW index if this design represents a significant capacitance addition verses the current single-ended GSG design. The design has Gap 1>>Gap 2 for weak signal coupling to the ground trace. The size of Gap 1 and Gap 2 depends on the exact process and design, but generally, the gaps are designed such that the RF field amplitude is much larger between S̄S than between S-GND or S̄-GND', since most of the RF energy should overlap with the optical waveguides. In this example, the RF field amplitude is ~1.39 times stronger in Gap 3 versus Gap 2 for a chirpless design (i.e., Gap 3=Gap 2/1.39), since the modulation fill factor is ~78% and ~56% for top and bottom arms, but could be smaller or larger based on various design factors. Finally, Gap 4 needs to be the smallest fraction of L1 as possible to increase modulation efficiency. Gap 4 should be the thinnest value that allows for negligible crosstalk and lateral capacitive coupling between S and Sbar. L1 should be the longest length that allows for the lumped approximation (L<~Lambda/10 at the highest MW frequency in the passband, e.g., 100 GHz) to hold for each T-rail segment taken individually. There is no restriction on the overlap L2.

Figure 9:
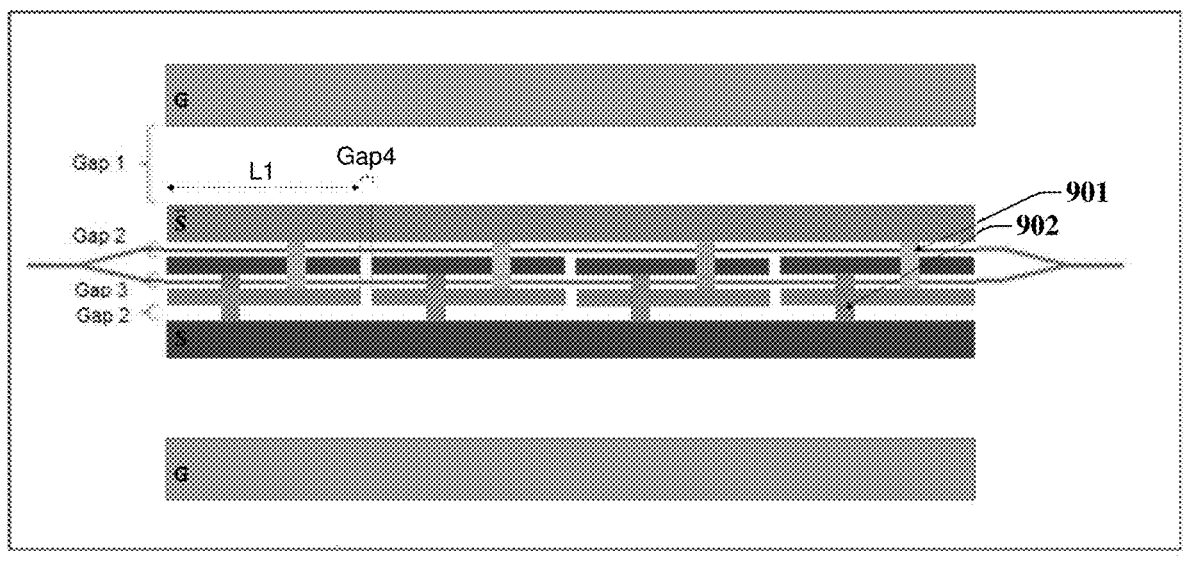
FIG. 9 is a block diagram illustrating an example, non-limiting embodiment of a G$\overline{S}$SG MZM configuration for Pockels-based modulators having inter-digitated T-rail capacitive segments overlapping each other and equal fill factor in both arms in accordance with various aspects described herein.

FIG. 9 is a block diagram illustrating an example, non-limiting embodiment of a GS̄SG MZM configuration for Pockels-based modulators having inter-digitated T-rail capacitive segments overlapping each other and equal fill factor in both arms in accordance with various aspects described herein. As shown in FIG. 9, the design further proposes a natively equal and increased modulation fill factor in both waveguides (not requiring specific gap ratios), by introducing RF crossovers. The arms have a higher overall modulation fill factor of the MZM length because there is two times less "dead zones" per length than the embodiments of FIGS. 7-8. The same design constraints described in connection with FIG. 8 are applicable. Additionally, the location of electrical crossovers 901, 902 should be optimized to minimize RF crosstalk between the crossovers.

Figure 10:
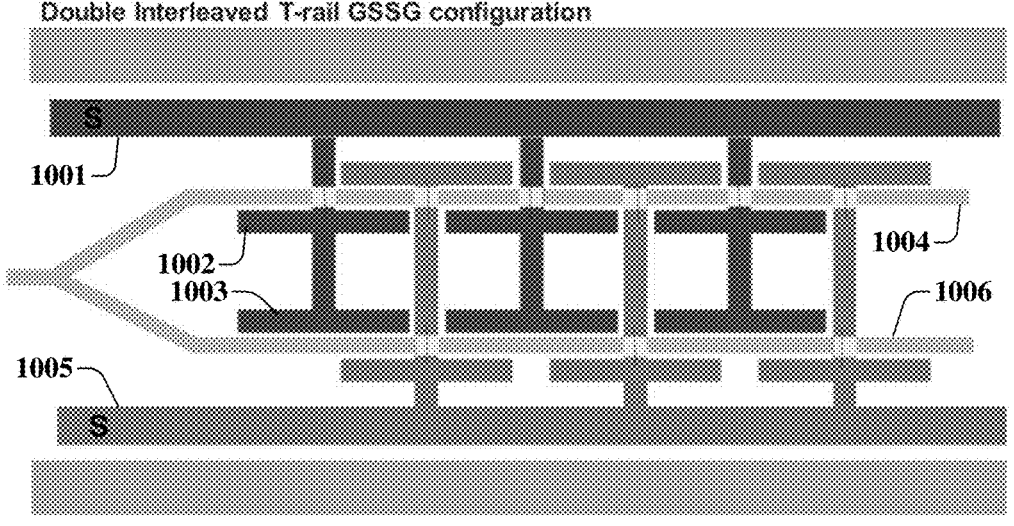
FIG. 10 is a block diagram illustrating an example, non-limiting embodiment of a G$\overline{S}$SG MZM configuration for Pockels-based modulators having inter-digitated double T-rail capacitive segments and equal fill factor in both arms in accordance with various aspects described herein.

FIG. 10 is a block diagram illustrating an example, non-limiting embodiment of a GS̄SG MZM configuration for Pockels-based modulators having inter-digitated double T-rail capacitive segments and equal fill factor in both arms in accordance with various aspects described herein. As shown in FIG. 10, the design has a relative position of optical waveguides in the structure that is slightly different than in FIGS. 7-9. This design also features a natively equal modulation fill factor in both arms. In the design, S double T-rail capacitive segments 1001 include a second inter-digitated T-rail capacitive segment 1002 beneath a bottom side 1003 of the T-rail. The second inter-digitated T-rail segments have a top side facing the bottom side of the T-rail capacitive segment and a bottom side facing the signal trace. The optical waveguides pass between the faces of the T-rail and the complimentary second segment. More particularly, a first optical waveguide 1004 passes in a gap between the bottom side of each T-rail capacitive segment of the S T-rail capacitive segments 1005 and the bottom side of the second inter-digitated T-rail segments of the S T-rail capacitive segments 1001, and the second optical waveguide 1006 passes in a gap between the top side of each T-rail capacitive segment of the S T-rail capacitive segments 1001 and the top side of each of the second inter-digitated T-rail capacitive segment of S T-rail capacitive segments 1005. One key benefit of the design illustrated in FIG. 10 over the designs illustrated in FIGS. 7-9 is the equal fill factor in both arms.

Figure 11:
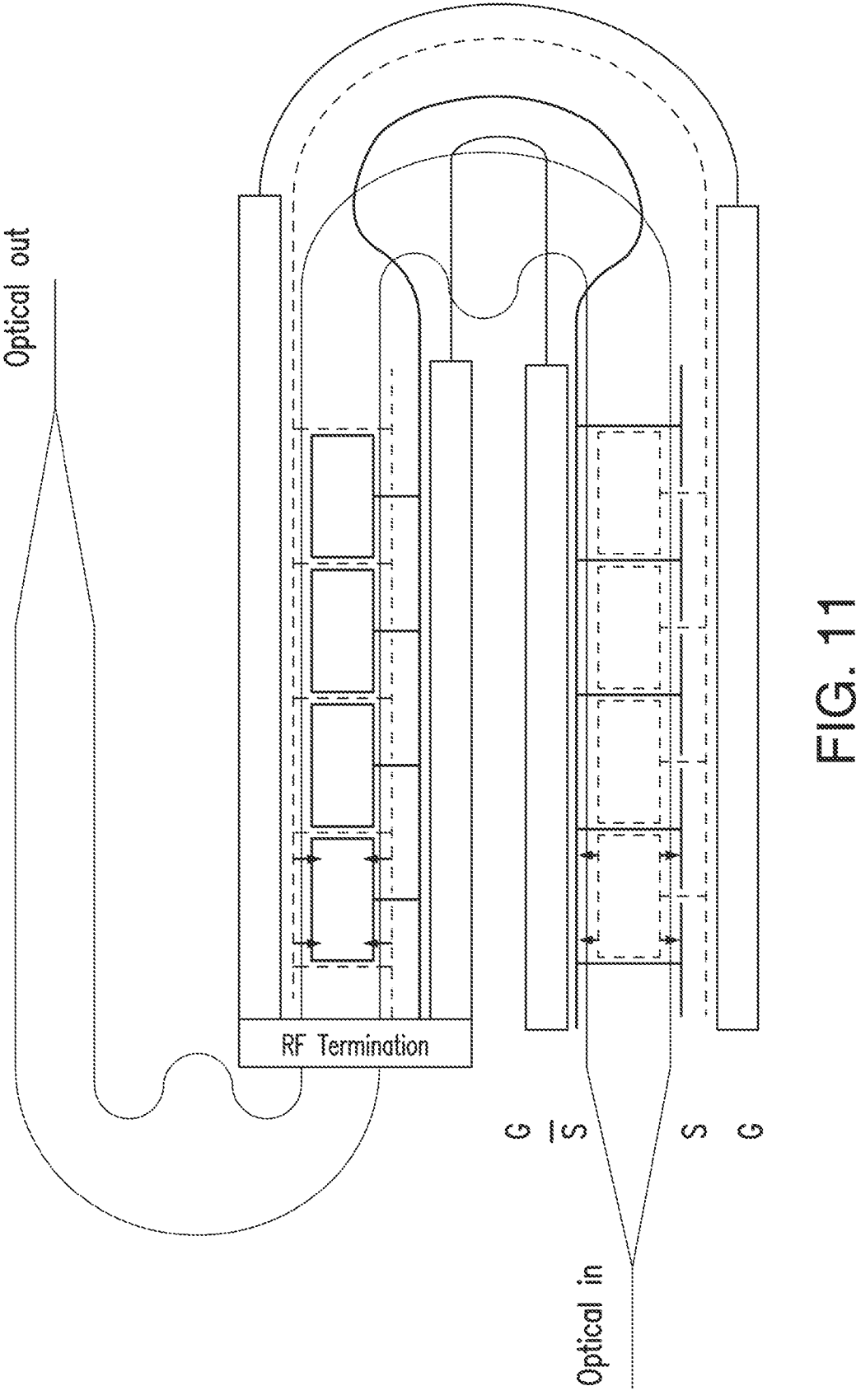
FIG. 11 is a block diagram illustrating an example, non-limiting embodiment of a G$\overline{S}$SG MZM configuration for Pockels-based modulators with a fold and having inter-digitated T-rail segments in accordance with various aspects described herein.

FIG. 11 is a block diagram illustrating an example, non-limiting embodiment of a GS̄SG MZM configuration for Pockels-based modulators with a fold and having inter-digitated T-rail segments in accordance with various aspects described herein. The geometry illustrated in FIG. 11 provides design considerations if a T-rail based design (any) was to be folded—purely to 'densify' the phase shifter, not as a mean of avoiding chirp in a GS̄SG structure. Indeed, the T-rail based designs do not require a fold for this, they are nominally immune to chirp even in a straight line layout, and in a broadband fashion (as currently conveyed in the application). The design considerations include:

Optical p/n match been fixed by inside waveguide bending.

Optical mode filtering and p/n loss mismatch fixed by duplicate the turns.

Electrical waveguide blue signal S-bar length path is enlarged to match the red signal S.

In the bending area, the optical waveguide has been put outside of or parallel to the electrical fields generated by RF lines as much as possible (to avoid RF absorption).

The optical bending section is shorter than the electrical bending section since without T tails, the electrical signal have a larger velocity.

Figure 12:
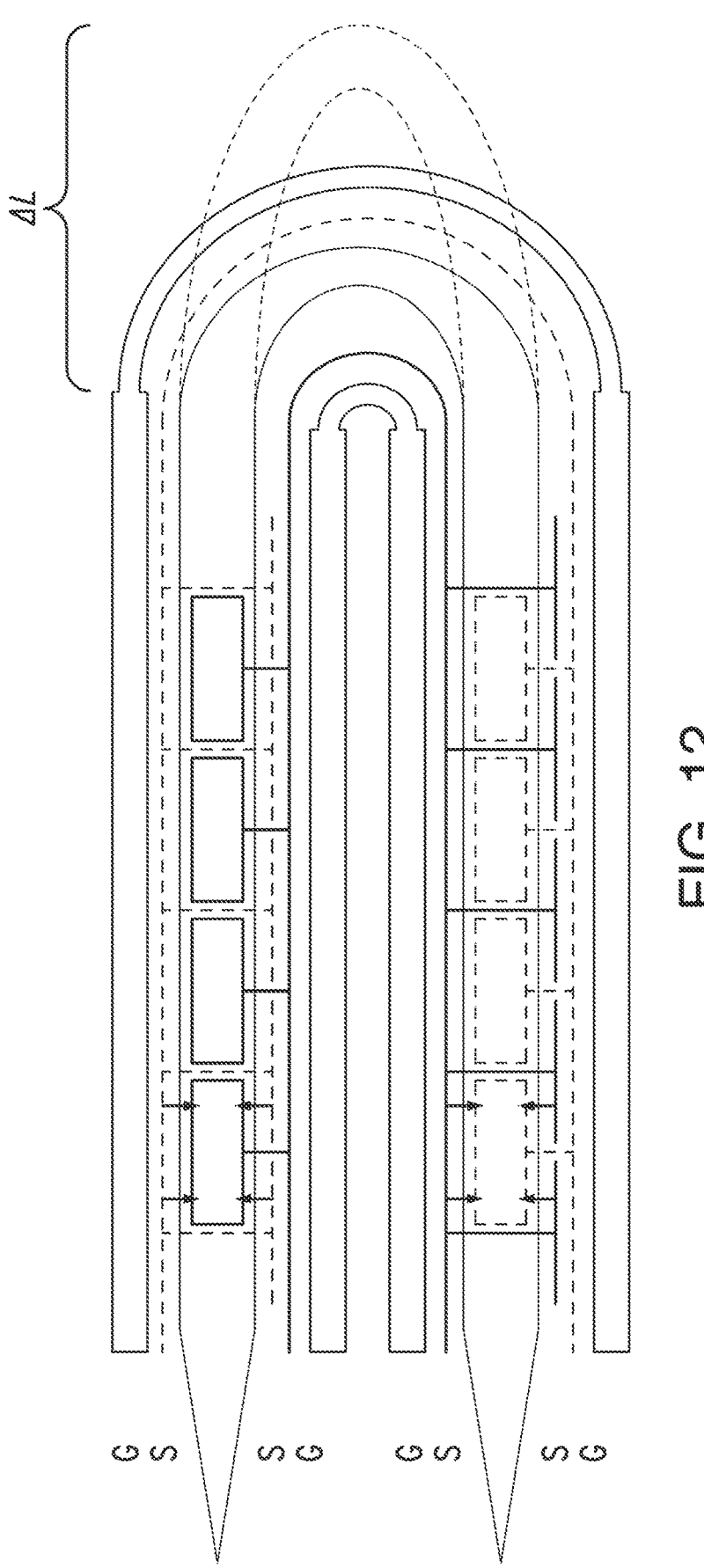
FIG. 12 is a block diagram illustrating an example, non-limiting embodiment of a G$\overline{S}$SG MZM configuration for Pockels-based modulators with a fold and having inter-digitated T-rail segments with longer optical paths in the fold region in accordance with various aspects described herein.

FIG. 12 is a block diagram illustrating an example, non-limiting embodiment of a GSSG MZM configuration for Pockels-based modulators with a fold and having inter-digitated T-rail segments with longer optical paths in the fold region in accordance with various aspects described herein. The geometry illustrated in FIG. 12 provides design considerations for all T-rail based designs: considering that the main practical challenge of T-rail based designs is likely to be their higher RF index, i.e., slow RF wave effect due to added capacitance coming from the T rails compromising the velocity matching condition with the optical wave, optional periodic optical delays could be added along the travelling-wave structure. They could for example take the form of the schematics illustrated in FIG. 13 below. The general idea behind periodically compensating the higher RF index with optical delays is to avoid major layer stack re-designs to retrieve the velocity matching condition with the optical wave. FIG. 12 illustrates longer optical waveguides in the bend regions if the design is folded, shown as Delta_L.

Figure 13:
FIG. 13 is a block diagram illustrating an example, non-limiting embodiment of a G$\overline{S}$SG MZM configuration for Pockels-based modulators having inter-digitated T-rail segments with periodic serpentine optical paths in accordance with various aspects described herein.

FIG. 13 is a block diagram illustrating an example, non-limiting embodiment of a GSSG MZM configuration for Pockels-based modulators having inter-digitated T-rail segments with periodic serpentine optical paths in accordance with various aspects described herein. As illustrated in FIG. 13, the waveguides comprise periodic 'serpentines' in the straight sections of the travelling-wave structure. In an embodiment, these serpentines may be incorporated in the layout, considering a minimum bend radius and if the serpentines do not introduce any meaningful added attenuation due to repeated crossings under the RF metal. The frequency of the serpentines must be sufficient to avoid, in the modulating sections, significant walk-off between a point (fixed phase) on the RF wave and the corresponding phase on the optical wave, due to their different group velocity. Significant walk-off would result in inter-symbol interference (ISI) and to a reduction of the modulator E-O bandwidth. Another way (not shown) of slowing down the optical wave, instead of serpentines, would be to leverage a hybrid TFL-SiPhot platform, in which the effective and group index of the optical wave would inherently be higher.

Figure 14A:
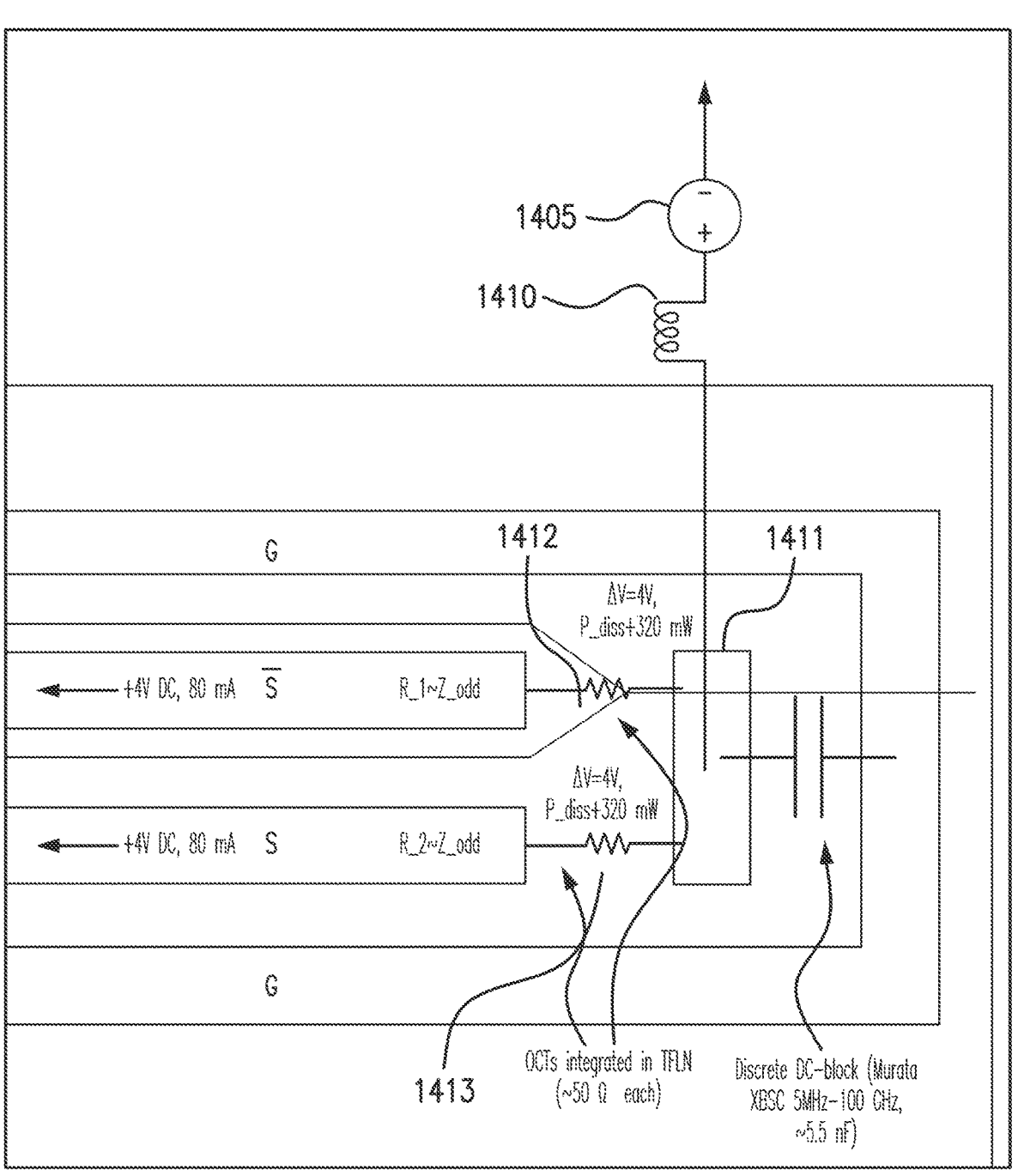
FIGS. 14A and 14B are block diagrams illustrating exemplary, non-limiting embodiments of RF termination schemes enabling driver/ASIC output bias through a TFLN G$\overline{S}$SG MZM in accordance with various aspects described herein.
Figure 14B:
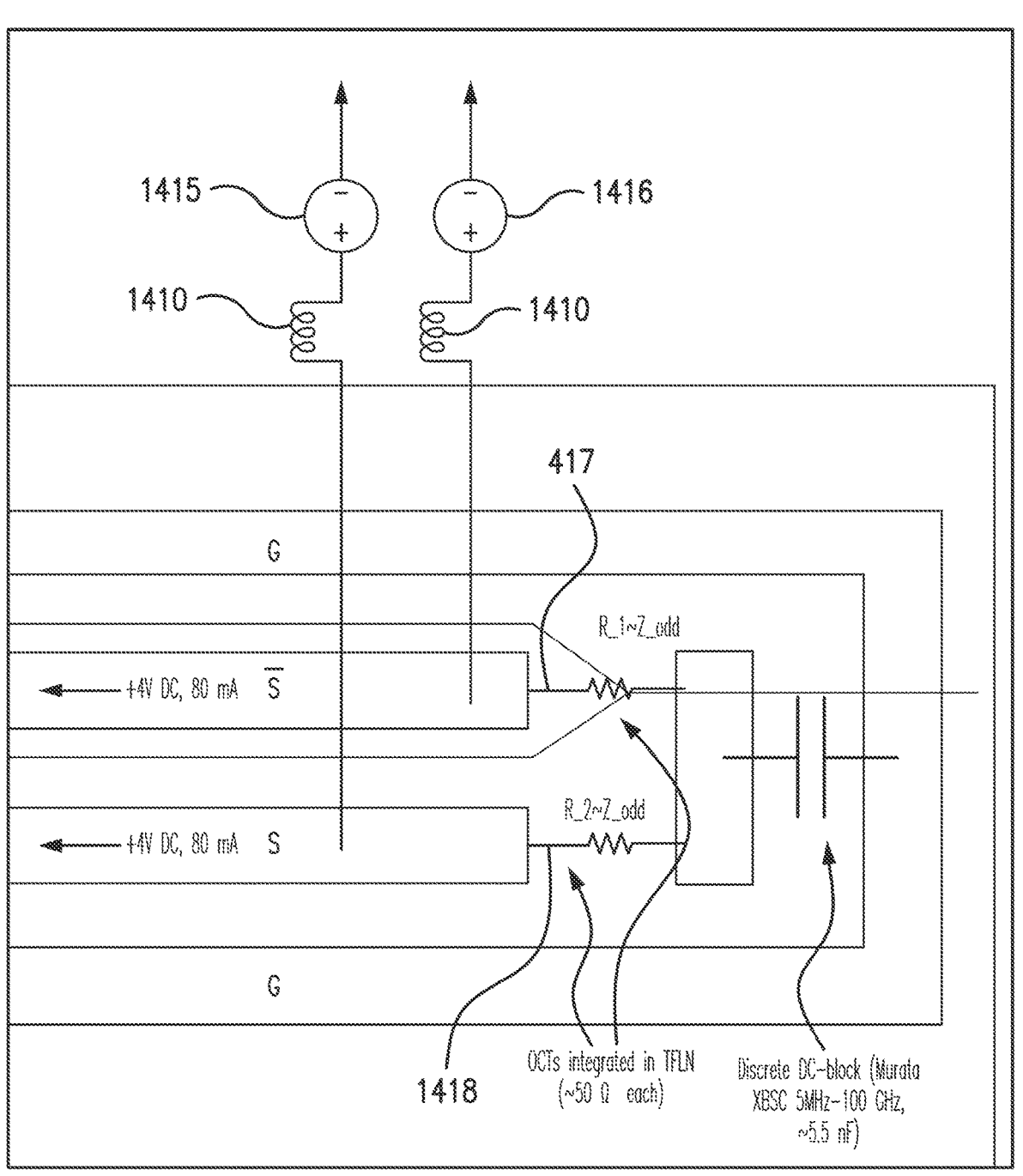

FIGS. 14A and 14B are block diagrams illustrating exemplary, non-limiting embodiments of RF termination schemes enabling driver/ASIC output bias through a TFLN GSSG MZM in accordance with various aspects described herein. No DC current flows through the MZM grounds. The residual common MW mode is mostly AC-coupled to GND via the external DC-block. Note that on the DC bias path, the off-chip RF choke(s) 1410 is optional and may not be necessary.

As illustrated in FIG. 14A, the driver bias 1405 is applied on a metal strip 1411 to the right of the differential mode termination. The DC bias input splits into two equal currents flowing through the S and S̄ complements. The differential MW mode is mostly terminated into the two series on-chip resistors 1412, 1413 for which (each) R≈Z_odd of the TW structure. Since most of the remaining RF energy (after propagation along the TW structure) has been absorbed into the terminations at that point, the risk of the DC bias trace impairing the RF performance of the device is minimal. However, the static DC power burned (wasted) across the on-chip RF terminations is substantial with this design.

As illustrated in FIG. 14B, the driver bias 1415, 1416 is applied directly on the HSPS section of the modulator, to the left of the differential mode terminations 1417, 1418. This time, careful attention must be paid to the RF chokes 1410 (or more generally, inductance) design along the DC bias path, to avoid perturbating the propagation of the RF wave, especially the lower frequencies which are not very attenuated even after propagation along the TW for TFLN modulators. This scheme has the advantage of avoiding dropping DC power across the RF terminations since no current is flowing through them.

In general, biasing a driver or ASIC through a TFLN modulator entails a significant drift of the MZM phase bias point over time, due to charge accumulation across the optical rib waveguides. This negative effect can be overcome with bias control loops with wide enough voltage rails since this charge accumulation effect is rather slow (well within the loop BW).

In general, the proposed structures illustrated in FIGS. 3-14 above enable the following benefits:

1) using conventional differential-output driver architectures directly on TFLN modulators, without resorting to RF splits that are hard to design at 100 GHz with acceptable RF loss, 2) either reducing the drive voltage required per complement or reducing the modulator length (or a combination of the two) to achieve the same phase shift as an equivalent-length GSG single-drive MZM design.

3) if biasing the DAC/driver through its outputs, both MZM termination schemes of FIG. 11 allow for a reduction in the RF loss between the driver output and TFLN, by avoiding DC blocks and bias-tees there (with a DC coupled connection between the driver output and TFLN). This adds even more to the available swing at the MZM.

The $1^{st}$ benefit described above is significant considering the inherent benefits of differential driving. Amongst other things, using a differential waveform from the DAC offers clearly superior performance compared to using a single complement, stripping away some of the common mode, non-linearity and eye imbalances.

From initial simulations, DAC non-linearity is highly asymmetric for a single-ended output. This is the main source of waveform SNR degradation. Confirmed non-linearity primarily shows as compression at the low voltage (high current) end of the swing on each side of the diff output so asymmetry is expected when used single-ended.

The $2^{nd}$ benefit above is just as significant: the sheer size of current single-ended TFLN modulator dies is a severe limitation for package designs, since those are standardized: OIF CDM form factor for WL6e, and QSFP-DD/OSFD-XD for WL6n/p.

Moreover, reaching a sufficient output voltage level on a single-ended drive signal to meet the current modulation loss budgets for the aforementioned applications is a real challenge from a design perspective for the driver. Instead, splitting the required swing on two complements offers an obvious advantage.

The $3^{rd}$ benefit above, if biasing the DAC/driver through its outputs, adds meaningful RF power to the MZM input and may also save space overall in the package (eliminating RF fan-out/fan-in to/from the DC-blocks between the driver and modulators).

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A linear electro-optic modulator, comprising:
a first signal trace;
a second signal trace, wherein the first signal trace and the second signal trace are driven by a differential signal;
a first optical arm; and
a second optical arm, wherein a geometry of the first signal trace and the second signal trace causes the differential signal to modulate optical signals in the first optical arm and the second optical arm, such that when the optical signals are combined to create a resultant optical signal, the geometry mitigates chirp in the resultant optical signal, wherein the geometry comprises an electrical crossover of the first signal trace and the second signal trace, and wherein a first ratio of a segment length before and after the electrical crossover is less than one and is the inverse of a second ratio of an average attenuation before and after the electrical crossover.

2. The linear electro-optic modulator of claim 1, wherein the electrical crossover is optimized to minimize radio frequency crosstalk.

3. The linear electro-optic modulator of claim 1, wherein the geometry comprises a fold of the first signal trace and the second signal trace and at least one crossover of the first optical arm or the second optical arm and the first signal trace or the second signal trace.

4. The linear electro-optic modulator of claim 3, wherein the geometry comprises a first crossover of the first optical arm and the first signal trace, a second and a third crossover of the first optical arm and the second signal trace, and a fourth crossover of the second optical arm and the second signal trace.

5. The linear electro-optic modulator of claim 3, wherein the geometry comprises a first crossover of the first optical arm and the first signal trace and a second crossover of the second optical arm and the second signal trace.

6. The linear electro-optic modulator of claim 1, wherein the geometry comprises a first plurality of T-rail segments of the first signal trace and a second plurality of T-rail segments of the second signal trace, wherein the second plurality of T-rail segments are inter-digitated with the first plurality of T-rail segments.

7. The linear electro-optic modulator of claim 6, wherein a distance between ends of consecutive T-rail segments is smaller than a length of a top side of a T-rail segment.

8. The linear electro-optic modulator of claim 6, wherein the first optical arm passes in a second gap between the first signal trace and a top side of each T-rail segment of the second plurality of T-rail segments, and wherein the second optical arm passes in a third gap between a bottom side of each T-rail segment of the first plurality of T-rail segments and a bottom side of each T-rail segment of the second plurality of T-rail segments.

9. The linear electro-optic modulator of claim 8, wherein the second gap is larger than the third gap.

10. The linear electro-optic modulator of claim 6, wherein the geometry comprises a fold having no crossovers in the fold of the first signal trace, the second signal trace, the first optical arm and the second optical arm.

11. The linear electro-optic modulator of claim 6, wherein the geometry comprises a fold having crossovers in the fold of the first signal trace, the second signal trace, the first optical arm and the second optical arm, and wherein a length of the first optical arm and the second optical arm in the fold is increased to achieve a velocity matching condition.

12. The linear electro-optic modulator of claim 6, wherein the geometry comprises two electrical crossovers of each T-rail segment in the first plurality of T-rail segments with a respective T-rail segment of the second plurality of T-rail segments.

13. The linear electro-optic modulator of claim 1, wherein the first optical arm and the second optical arm comprise a thin-film lithium niobate.

14. The linear electro-optic modulator of claim 13, comprising a substrate of silicon or quartz.

15. A method of modulating an optical signal, comprising:
splitting the optical signal into a first optical signal and a second optical signal;

providing the first optical signal to a first optical arm of a linear electro-optic modulator;

providing the second optical signal to a second optical arm of the linear electro-optic modulator;

applying a differential electrical signal to a first signal trace and a second signal trace of the linear electro-optic modulator to modulate the first optical signal and the second optical signal, resulting in a modulated first optical signal and a modulated second optical signal; and combining the modulated first optical signal and the modulated second optical signal, wherein a geometry of the first signal trace and the second signal trace of the linear electro-optic modulator causes the differential electrical signal to modulate first optical signal in the first optical arm and the second optical signal in the second optical arm, such that when the optical signals are combined to create a resultant optical signal, the geometry mitigates chirp in the resultant optical signal, wherein the geometry comprises an electrical crossover of the first signal trace and the second signal trace, and wherein a first ratio of a segment length before and after the electrical crossover is less than one and is the inverse of a second ratio of an average attenuation before and after the electrical crossover.

16. The method of claim 15, wherein the electrical crossover is optimized to minimize radio frequency crosstalk.

17. The method of claim 15, wherein the geometry comprises a first plurality of T-rail segments of the first signal trace and a second plurality of T-rail segments of the second signal trace, wherein the second plurality of T-rail segments are inter-digitated with the first plurality of T-rail segments.

18. A method for manufacturing a linear electro-optic modulator, comprising:

forming a first optical arm;

forming a second optical arm; and forming a first signal trace and a second signal trace, wherein a geometry of the first signal trace and the second signal trace causes a differential signal applied to the first signal trace and the second signal trace to modulate a first optical signal in the first optical arm and a second optical signal in the second optical arm, such that a combination of the first optical signal and the second optical signal creates a resultant optical signal, wherein the geometry mitigates chirp in the resultant optical signal, wherein the geometry comprises an electrical crossover of the first signal trace and the second signal trace, and wherein a first ratio of a segment length before and after the electrical crossover is less than one and is the inverse of a second ratio of an average attenuation before and after the electrical crossover.

19. The method of claim 18, wherein the second ratio is based on an average attenuation level over each segment length before and after the electrical crossover.

20. The method of claim 19, wherein the average attenuation level is over frequency.

* * * * *